United States Patent
He et al.

(10) Patent No.: US 9,713,127 B2
(45) Date of Patent: Jul. 18, 2017

(54) METHOD AND DEVICE FOR CONFIGURING DATA TRANSMISSION RESOURCE

(71) Applicant: Huawei Technologies Co., Ltd., Shenzhen, Guangdong (CN)

(72) Inventors: Chuanfeng He, Beijing (CN); Bingyu Qu, Beijing (CN); Jiafeng Shao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/010,261

(22) Filed: Jan. 29, 2016

(65) Prior Publication Data
US 2016/0150518 A1 May 26, 2016

Related U.S. Application Data

(63) Continuation of application No. PCT/CN2013/080656, filed on Aug. 1, 2013.

(51) Int. Cl.
*H04L 1/18* (2006.01)
*H04W 40/00* (2009.01)
*H04W 72/04* (2009.01)

(52) U.S. Cl.
CPC ....... *H04W 72/0406* (2013.01); *H04L 1/1887* (2013.01)

(58) Field of Classification Search
USPC ....................................................... 370/329
See application file for complete search history.

(56) References Cited

U.S. PATENT DOCUMENTS

2005/0207345 A1 9/2005 Onggosanusi et al.
2009/0300456 A1* 12/2009 Pelletier ................ H04L 1/1812
714/749

(Continued)

FOREIGN PATENT DOCUMENTS

CN 102948103 A 2/2013

OTHER PUBLICATIONS

"Dual-Cell HSUPA Considerations", InterDigital, 3GPP TSG-RAN WG2 Meeting #65bis, Mar. 23-27, 2009, 4 pages, R2-092449.

(Continued)

*Primary Examiner* — Edan Orgad
*Assistant Examiner* — Sithu Ko

(57) ABSTRACT

Embodiments of the present invention disclose a method and a device for configuring a data transmission resource and relate to the communications field. The solution includes: configuring, by a network device, a first transmission resource and a second transmission resource for UE, and configuring, for the UE, a resource of a PUCCH corresponding to a physical downlink control channel in the second transmission resource; and receiving a PUCCH sent by the user equipment, and when the received PUCCH carries negative acknowledgement information, retransmitting, by using a PDSCH of the first transmission resource, the data carried in the PDSCH of the second transmission resource, and indicating, by using signaling of a physical downlink control channel of the first transmission resource, to the UE that the data transmitted by the PDSCH of the first transmission resource is retransmitted data carried in the PDSCH of the second transmission resource.

10 Claims, 6 Drawing Sheets

(56) References Cited

U.S. PATENT DOCUMENTS

| | | | |
|---|---|---|---|
| 2010/0296389 A1 | 11/2010 | Khandekar et al. | |
| 2011/0268048 A1* | 11/2011 | Toskala | H04L 1/16 370/329 |
| 2012/0026892 A1* | 2/2012 | Nakao | H04L 1/1854 370/242 |
| 2016/0044690 A1* | 2/2016 | Li | H04W 52/0209 370/329 |

OTHER PUBLICATIONS

"PUCCH resource allocation for ACK/NACK", LG Electronics, 3GPP TSG RAN WG1 #63, Nov. 15-19, 2010, 7 pages, R1-106129.

* cited by examiner

METHOD AND DEVICE FOR CONFIGURING DATA TRANSMISSION RESOURCE

CROSS-REFERENCE TO RELATED APPLICATIONS

This application is a continuation of International Patent Application No. PCT/CN2013/080656, filed on Aug. 1, 2013, which is hereby incorporated by reference in its entirety.

TECHNICAL FIELD

The embodiment of the present invention relates to the communications field, and in particular, to a method and a device for configuring a data transmission resource.

BACKGROUND

In a current Long Term Evolution (LTE) system, a hybrid automatic repeat request (HARQ) technology is widely used. For example, in a downlink direction, an evolved NodeB (eNodeB) in the LTE system sends a data packet to user equipment (UE). When the UE correctly receives the data packet, the UE returns an acknowledgement (ACK) to the eNodeB, and when the UE does not correctly receive the data packet, the UE returns a negative acknowledgement (NACK) to the eNodeB, so that the eNodeB retransmits the data packet that is not correctly received by the UE.

In an LTE-Advanced system, a carrier aggregation (CA) technology is supported, where the technology aggregates multiple component carriers to provide larger bandwidth. Each carrier has an independent HARQ process of its own, that is, both initial transmission and retransmission that are of one HARQ process are performed on one carrier, and multiple carriers have their own HARQ processes. For example, a network device 1 and a network device 2 may send a data packet to the UE at the same time by using the CA technology, and the UE may receive the data packet from the two network devices. Based on the foregoing HARQ technology, after receiving the data packet, the UE further needs to return answer information to a network device according to whether the data packet is correctly received. However, if the answer information can be carried on only one uplink carrier due to a limitation on an uplink transmission capability of the UE, the answer information sent by the UE for the data packet that is sent by the two network devices can be received by only one network device. Therefore, for the network device 1 and the network device 2, if the network device 1 has a capability to receive the answer information sent by the UE for the data packet that is sent by the two network devices, the network device 1 transmits, to the network device 2 by means of backhaul, answer information that is in the received answer information and that is for the network device 2.

An existing CA technology is for an ideal application scenario, and ideal backhaul between network devices is required or one network device controls multiple carriers. An information exchange delay of the ideal backhaul is very short, and information may be exchanged in a timely manner. However, in actual deployment, due to an environment in which a device is located, a construction cost, and the like, the ideal backhaul between the network devices is difficult to be implemented. In a case of non-ideal backhaul, a relatively great delay may occur in information exchange between the network devices. Therefore, for a network device that is in multiple network devices implementing the CA technology and that can receive the answer information, the network device needs to transmit, to another network device, the answer information fed back by the UE for the data packet that is sent by the network devices. However, the answer information probably cannot be transmitted to the other network device in a timely manner due to a delay of the information exchange between the network devices, and data cannot be retransmitted in a timely manner. Therefore, the CA cannot be implemented.

The prior art provides a technical solution in which when only one network device schedules, for UE, physical downlink shared channel (PDSCH) transmission at a same moment, the UE feeds back, by means of quick switching of an uplink frequency channel number, ACK or NACK information for the PDSCH transmission of the network device, and two devices serve one user in a time division manner. Because there is a fixed time difference between transmission of uplink ACK/NACK and transmission of a downlink PDSCH, for example, the transmission of the ACK/NACK lags behind the PDSCH by four subframes. Therefore, the ACK/NACK is transmitted in an uplink time division manner, causing time division transmission of the downlink PDSCH. Although this manner enables the network device to acquire the ACK or the NACK in a timely manner, a peak rate that a CA technology may reach is limited, that is, a PDSCH cannot be transmitted to a same user at a same moment on two carriers, which is not real carrier aggregation.

In an existing carrier aggregation technology, one network device may control multiple carriers, but there must be a center control scheduler that can quickly obtain scheduling information of the multiple carriers. However, if one network device has multiple units that respectively control the carriers, quick information exchange among all units is required.

In the prior art, in a case in which concurrent transmission capabilities of multiple carriers for user equipment in an uplink direction are limited, for an implementation solution of carrier aggregation of two network devices or a same network device, quick information exchange needs to be performed between the two network devices or quick information exchange needs to be performed between different units of the same network device, causing a problem of hardware implementation complexity.

SUMMARY

Embodiments of the present invention provide a method and a device for configuring a data transmission resource, which can implement a solution of carrier aggregation in a case in which quick information exchange between two network devices or between different units of a same network device is not required, reducing a requirement on device hardware complexity for implementing the carrier aggregation.

To achieve the foregoing objective, the following technical solutions are adopted in the embodiments of the present invention:

According to a first aspect, the present invention provides a method for configuring a data transmission resource, including:

configuring, by a network device, a first transmission resource and a second transmission resource for user equipment (UE), where carrier frequencies of the first transmission resource and the second transmission resource are different;

configuring, by the network device for the UE, a resource of a physical uplink control channel (PUCCH) corresponding to a physical downlink control channel in the second transmission resource, where the resource of the PUCCH is located on an uplink carrier corresponding to a downlink carrier of the first transmission resource, where the resource of the PUCCH is acquired by the UE according to a signaling indication or higher layer signaling of at least one physical downlink control channel in the physical downlink control channel, where the PUCCH is used to carry answer information sent by the UE for data that is carried in a physical downlink shared channel PDSCH of the second transmission resource; and receiving, by the network device, the PUCCH sent by the UE, where when information carried in the PUCCH is negative acknowledgement information, the negative acknowledgement information is the answer information sent by the UE for the data that is carried in the PDSCH of the second transmission resource, retransmitting, by the network device by using a PDSCH of the first transmission resource, the data carried in the PDSCH of the second transmission resource, and indicating, by using signaling of a physical downlink control channel of the first transmission resource, to the UE that the data transmitted by the PDSCH of the first transmission resource is retransmitted data carried in the PDSCH of the second transmission resource.

With reference to the first aspect, in a first possible implementation manner of the first aspect, the indicating, by using signaling of a physical downlink control channel of the first transmission resource, to the UE that the data transmitted by the PDSCH of the first transmission resource is retransmitted data carried in the PDSCH of the second transmission resource includes:

indicating, by using control information carried in the physical downlink control channel of the first transmission resource, to the UE that the data transmitted by the PDSCH of the first transmission resource is the retransmitted data carried in the PDSCH of the second transmission resource; or indicating, by performing scrambling on the physical downlink control channel of the first transmission resource by using a virtual cell identity or a scrambling code, to the UE that the data transmitted by the PDSCH of the first transmission resource is the retransmitted data carried in the PDSCH of the second transmission resource; or indicating, by performing, by using an identity of the UE, scrambling on cyclic redundancy check (CRC) of control information carried in the physical downlink control channel of the first transmission resource, to the UE that the data transmitted by the PDSCH of the first transmission resource is the retransmitted data carried in the PDSCH of the second transmission resource.

With reference to the first possible implementation manner of the first aspect, in a second possible implementation manner of the first aspect, before the retransmitting, by the network device by using a PDSCH of the first transmission resource, the data carried in the PDSCH of the second transmission resource, the method further includes:

acquiring, according to the negative acknowledgement information, the data carried in the PDSCH of the second transmission resource.

With reference to the first aspect, in a third possible implementation manner of the first aspect, the acquiring, by the UE, the resource of the PUCCH according to a signaling indication of at least one physical downlink control channel in the physical downlink control channel includes:

acquiring, by the UE, the resource of the PUCCH by using control information carried in the at least one physical downlink control channel in the physical downlink control channel; or acquiring, by the UE, the resource of the PUCCH by performing scrambling on the at least one physical downlink control channel in the physical downlink control channel by using a virtual cell identity or a scrambling code; or acquiring, by the UE, the resource of the PUCCH by performing, by using an identity of the user equipment, scrambling on cyclic redundancy check (CRC) of control information carried in the at least one physical downlink control channel in the physical downlink control channel.

With reference to the first aspect, in a fourth possible implementation manner of the first aspect, the configuring, by the network device for the UE, a resource of a PUCCH corresponding to a physical downlink control channel in the second transmission resource includes:

configuring, by the network device for the UE, a resource of a PUCCH corresponding to part of physical downlink control channels in the second transmission resource.

With reference to the first aspect or any one of the first to the fourth possible implementation manners of the first aspect, in a fifth possible implementation manner of the first aspect, the method further includes:

the network device is a first network device, the first transmission resource is a transmission resource used by the first network device and the UE, and the second transmission resource is a transmission resource used by a second network device and the UE.

According to a second aspect, a method for configuring a data transmission resource is provided, including:

acquiring, by user equipment UE, a first transmission resource and a second transmission resource that are configured by a network device for the UE, where carrier frequencies of the first transmission resource and the second transmission resource are different;

acquiring, by the UE according to a signaling indication or higher layer signaling of at least one physical downlink control channel in a physical downlink control channel, a resource of a physical uplink control channel (PUCCH) corresponding to the at least one physical downlink control channel, where the resource of the PUCCH is located on an uplink carrier corresponding to a downlink carrier of the first transmission resource, and the resource of the PUCCH is configured by the network device for the UE and corresponds to the physical downlink control channel in the second transmission resource, where the PUCCH is used to carry answer information sent by the UE for data that is carried in a physical downlink shared channel (PDSCH) of the second transmission resource;

sending, by the UE, the PUCCH to the network device, where information carried in the PUCCH is negative acknowledgement information, and the negative acknowledgement information is the answer information sent by the UE for the data that is carried in the PDSCH of the second transmission resource; and acquiring, by the UE, data carried in a PDSCH of the first transmission resource, and determining, according to a signaling indication of a physical downlink control channel of the first transmission resource, that the acquired data carried in the PDSCH of the first transmission resource is retransmitted data carried in the PDSCH of the second transmission resource.

With reference to the second aspect, in a first possible implementation manner of the second aspect, the determining, according to a signaling indication of a physical downlink control channel of the first transmission resource, that the acquired data is retransmitted data carried in the PDSCH of the second transmission resource includes:

determining, according to received control information carried in the physical downlink control channel of the first transmission resource, that the acquired data is the retransmitted data carried in the PDSCH of the second transmission resource; or determining, according to a virtual cell identity or a scrambling code used for scrambling of the received physical downlink control channel of the first transmission resource, that the acquired data is the retransmitted data carried in the PDSCH of the second transmission resource; or determining, according to an identity of the UE used for scrambling on cyclic redundancy check (CRC) of received control information carried in the physical downlink control channel of the first transmission resource, that the acquired data is the retransmitted data carried in the PDSCH of the second transmission resource.

With reference to the second aspect, in a second possible implementation manner of the second aspect, the acquiring, according to a signaling indication of at least one physical downlink control channel in a physical downlink control channel, a resource of a physical uplink control channel (PUCCH) corresponding to the at least one physical downlink control channel includes:

acquiring the resource of the PUCCH corresponding to the at least one physical downlink control channel according to received control information carried in the at least one physical downlink control channel; or acquiring the resource of the PUCCH corresponding to the at least one physical downlink control channel according to a virtual cell identity or a scrambling code used for scrambling of the received at least one physical downlink control channel; or acquiring the resource of the PUCCH corresponding to the at least one physical downlink control channel according to an identity of the UE used for scrambling on cyclic redundancy check (CRC) of received control information carried in the at least one physical downlink control channel.

With reference to the second aspect or either the first or the second possible implementation manner of the second aspect, in a third possible implementation manner of the second aspect, the method further includes:

combining the acquired data carried in the PDSCH of the first transmission resource with initially transmitted data corresponding to the acquired data.

With reference to the second aspect, in a fourth possible implementation manner of the second aspect, the acquiring, by the UE according to a signaling indication of at least one physical downlink control channel in a physical downlink control channel, a resource of a physical uplink control channel (PUCCH) corresponding to the at least one physical downlink control channel includes:

acquiring, by the UE according to a signaling indication of at least one physical downlink control channel of part of physical downlink control channels, the resource of the physical uplink control channel (PUCCH) corresponding to the at least one physical downlink control channel.

With reference to the second aspect, in a fifth possible implementation manner of the second aspect, the method includes:

the network device is a first network device, the first transmission resource is a transmission resource used by the first network device and the UE, and the second transmission resource is a transmission resource used by a second network device and the UE.

According to a third aspect, a network device is provided, including:

a configuring unit, configured to configure a first transmission resource and a second transmission resource for user equipment, where carrier frequencies of the first transmission resource and the second transmission resource are different; where the configuring unit is further configured to configure, for the UE, a resource of a physical uplink control channel (PUCCH) corresponding to a physical downlink control channel in the second transmission resource, where the resource of the PUCCH is located on an uplink carrier corresponding to a downlink carrier of the first transmission resource, where the resource of the PUCCH is acquired by the UE according to a signaling indication or higher layer signaling of at least one physical downlink control channel in the physical downlink control channel, where the PUCCH is used to carry answer information sent by the UE for data that is carried in a physical downlink shared channel (PDSCH) of the second transmission resource;

a receiving unit, configured to receive the PUCCH sent by the UE, where when information carried in the PUCCH is negative acknowledgement information, the negative acknowledgement information is the answer information sent by the UE for the data that is carried in the PDSCH of the second transmission resource;

a data transmitting unit, configured to retransmit, by using a PDSCH of the first transmission resource, the data carried in the PDSCH of the second transmission resource; and an indicating unit, configured to indicate, by using signaling of a physical downlink control channel of the first transmission resource, to the UE that the data that is retransmitted by the data transmitting unit and that is transmitted by the PDSCH of the first transmission resource is retransmitted data carried in the PDSCH of the second transmission resource.

With reference to the third aspect, in a first possible implementation manner of the third aspect, that the indicating unit is configured to indicate, by using signaling of a physical downlink control channel of the first transmission resource, to the UE that the data that is retransmitted by the data transmitting unit and that is transmitted by the PDSCH of the first transmission resource is retransmitted data carried in the PDSCH of the second transmission resource includes: the indicating unit is configured to indicate, by using control information carried in the physical downlink control channel of the first transmission resource, to the UE that the data transmitted by the PDSCH of the first transmission resource is the retransmitted data carried in the PDSCH of the second transmission resource; or the indicating unit is configured to indicate, by performing scrambling on the physical downlink control channel of the first transmission resource by using a virtual cell identity or a scrambling code, to the UE that the data transmitted by the PDSCH of the first transmission resource is the retransmitted data carried in the PDSCH of the second transmission resource; or the indicating unit is configured to indicate, by performing, by using an identity of the UE, scrambling on cyclic redundancy check (CRC) of control information carried in the physical downlink control channel of the first transmission resource, to the UE that the data transmitted by the PDSCH of the first transmission resource is the retransmitted data carried in the PDSCH of the second transmission resource.

With reference to the third aspect or the first possible implementation manner of the third aspect, in a second possible implementation manner of the third aspect, the network device further includes:

an acquiring unit, configured to: before the data transmitting unit retransmits, by using a PDSCH of the first transmission resource, the data carried in the PDSCH of the second transmission resource, acquire, according to the negative acknowledgement information, the data carried in the PDSCH of the second transmission resource.

With reference to the third aspect, in a third possible implementation manner of the third aspect, that the configuring unit is configured to configure, for the UE, a resource of a PUCCH corresponding to a physical downlink control channel in the second transmission resource includes: the configuring unit is configured to configure, for the UE, a resource of a PUCCH corresponding to part of physical downlink control channels in the second transmission resource.

With reference to the third aspect or any one of the first to the third possible implementation manners of the third aspect, in a fourth possible implementation manner of the third aspect, the network device is a first network device, the first transmission resource is a transmission resource used by the first network device and the UE, and the second transmission resource is a transmission resource used by a second network device and the UE.

According to a fourth aspect, a user terminal is provided, including:

an acquiring unit, configured to acquire a first transmission resource and a second transmission resource that are configured by a network device for the user equipment UE, where carrier frequencies of the first transmission resource and the second transmission resource are different; where, the acquiring unit is further configured to acquire, according to a signaling indication or higher layer signaling of at least one physical downlink control channel in a physical downlink control channel, a resource of a physical uplink control channel (PUCCH) corresponding to the at least one physical downlink control channel, where the resource of the PUCCH is located on an uplink carrier corresponding to a downlink carrier of the first transmission resource, and the resource of the PUCCH is configured by the network device for the UE and corresponds to the physical downlink control channel in the second transmission resource, where the PUCCH is used to carry answer information sent by the UE for data that is carried in a physical downlink shared channel (PDSCH) of the second transmission resource;

a sending unit, configured to send, to the network device, the PUCCH acquired by the acquiring unit, where information carried in the PUCCH is negative acknowledgement information, and the negative acknowledgement information is the answer information sent by the UE for the data that is carried in the PDSCH of the second transmission resource; where the acquiring unit is further configured to: acquire data carried in a PDSCH of the first transmission resource, and acquire a signaling indication of a physical downlink control channel of the first transmission resource; and a determining unit, configured to determine, according to the signaling indication that is acquired by the acquiring unit and that is of the physical downlink control channel of the first transmission resource, that the acquired data carried in the PDSCH of the first transmission resource is the retransmitted data carried in the PDSCH of the second transmission resource.

With reference to the fourth aspect, in a first possible implementation manner of the fourth aspect, that the determining unit is configured to determine, according to the signaling indication that is acquired by the acquiring unit and that is of the physical downlink control channel of the first transmission resource, that the acquired data carried in the PDSCH of the first transmission resource is retransmitted data carried in the PDSCH of the second transmission resource includes:

the determining unit is configured to determine, according to received control information carried in the physical downlink control channel of the first transmission resource, that the acquired data is the retransmitted data carried in the PDSCH of the second transmission resource; or the determining unit is configured to determine, according to a virtual cell identity or a scrambling code used for scrambling of the received physical downlink control channel of the first transmission resource, that the acquired data is the retransmitted data carried in the PDSCH of the second transmission resource; or the determining unit is configured to determine, according to an identity of the UE used for scrambling on cyclic redundancy check (CRC) of received control information carried in the physical downlink control channel of the first transmission resource, that the acquired data is the retransmitted data carried in the PDSCH of the second transmission resource.

With reference to the fourth aspect, in a second possible implementation manner of the fourth aspect, that the acquiring unit is configured to acquire, according to a signaling indication of at least one physical downlink control channel in a physical downlink control channel, a resource of a physical uplink control channel (PUCCH) corresponding to the at least one physical downlink control channel includes:

the acquiring unit is configured to acquire the resource of the PUCCH corresponding to the at least one physical downlink control channel according to received control information carried in the at least one physical downlink control channel; or the acquiring unit is configured to acquire the resource of the PUCCH corresponding to the at least one physical downlink control channel according to a virtual cell identity or a scrambling code used for scrambling of the received at least one physical downlink control channel; or the acquiring unit is configured to acquire the resource of the PUCCH corresponding to the at least one physical downlink control channel according to an identity of the UE used for scrambling on cyclic redundancy check (CRC) of received control information carried in the at least one physical downlink control channel.

With reference to the fourth aspect or either the first or the second possible implementation manner of the fourth aspect, in a third possible implementation manner of the fourth aspect, the user terminal further includes:

a combining unit, configured to combine the acquired data carried in the PDSCH of the first transmission resource with initially transmitted data corresponding to the acquired data.

With reference to the fourth aspect, in a fourth possible implementation manner of the fourth aspect, that the acquiring unit is configured to acquire, according to a signaling indication of at least one physical downlink control channel in a physical downlink control channel, a resource of a physical uplink control channel (PUCCH) corresponding to the at least one physical downlink control channel includes:

the acquiring unit is configured to acquire, according to a signaling indication of at least one physical downlink control channel of part of physical downlink control channels, the resource of the physical uplink control channel (PUCCH) corresponding to the at least one physical downlink control channel.

With reference to the fourth aspect, in a fifth possible implementation manner of the fourth aspect, the network device is a first network device, the first transmission resource is a transmission resource used by the first network device and the UE, and the second transmission resource is a transmission resource used by a second network device and the UE.

Embodiments of the present invention provide a method and a device for configuring a data transmission resource. A network device configures a first transmission resource and a second transmission resource for user equipment. For negative acknowledgement information sent by the user equipment for data that is carried in a physical downlink shared channel of a second transmission resource, the network device retransmits, by using a physical downlink shared channel of a first transmission resource, the foregoing data carried in the physical downlink shared channel of the second transmission resource, and indicates, by using signaling, to the user equipment that the retransmitted data is retransmission of the data carried in the physical downlink shared channel of the second transmission resource. According to the embodiments of the present invention, a solution of carrier aggregation can be implemented in a case in which quick information exchange between two network devices or between different units of a same network device is not required, ensuring a high-speed transmission rate of the network device while reducing a requirement on device hardware complexity for implementing the carrier aggregation.

BRIEF DESCRIPTION OF THE DRAWINGS

To describe the technical solutions in the embodiments of the present application or in the prior art more clearly, the following briefly introduces the accompanying drawings required for describing the embodiments or the prior art. Apparently, the accompanying drawings in the following description show merely some embodiments of the present application, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some rather than all of the embodiments of the present invention. All other embodiments obtained by persons of ordinary skill in the art based on the embodiments of the present application without creative efforts shall fall within the protection scope of the present application.

Various aspects are described in this specification with reference to a user terminal and/or a base station and/or a base station controller.

The user terminal may be a wireless terminal. The wireless terminal may refer to a device that provides a user with voice and/or data connectivity, a handheld device with a radio connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be a mobile station, a mobile, a remote station, a remote terminal, an access terminal, a user terminal, or user equipment.

The base station may be a base station (BTS) in the GSM or CDMA, a NodeB (NodeB) in the WCDMA, or an eNodeB in the LTE or LTE-A, which is not limited in the present application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The embodiment of the present invention uses a case of two carriers as an example, and is also applicable to a case of aggregation of more than two carriers. Retransmission of at least one carrier may be configured on another at least one carrier. Therefore, retransmission of multiple carriers may be configured on one carrier of UE, or retransmission of multiple carriers may be configured on several carriers of carriers that are configured for the UE.

Embodiment 1

Figure 1:
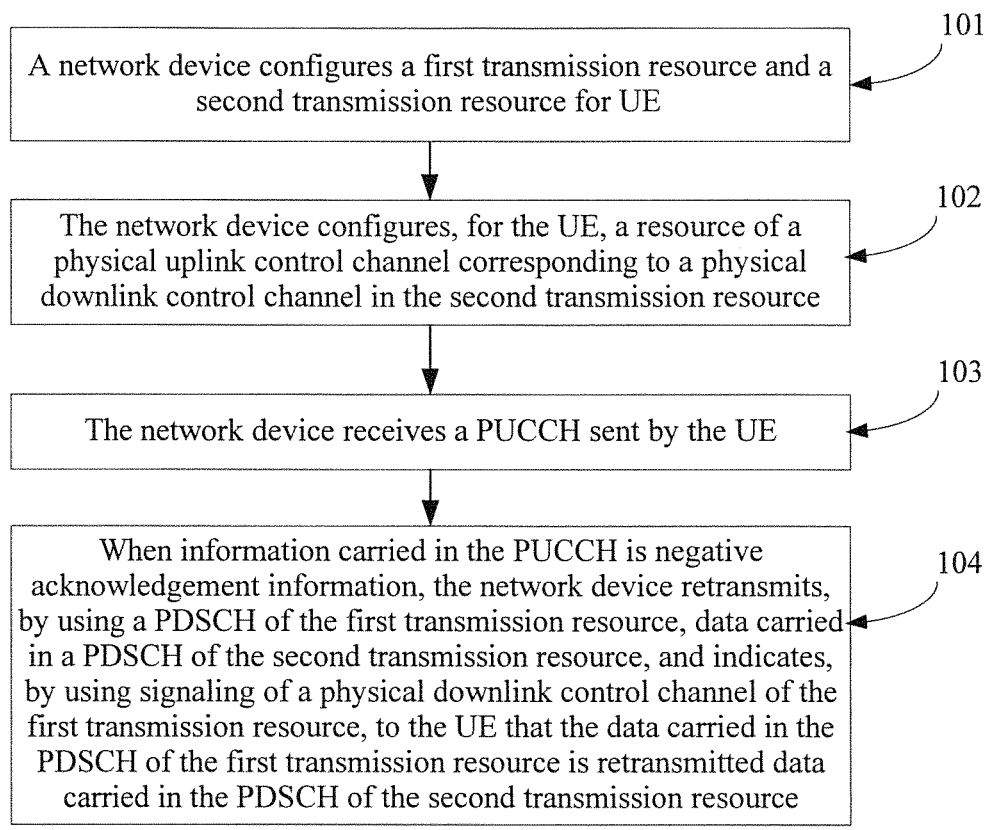
FIG. 1 is a flowchart of a method for configuring a data transmission resource according to Embodiment 1 of the present invention.

This embodiment of the present invention provides a method for configuring a data transmission resource and relates to a side of a network device. As shown in FIG. 1, the method includes:

101. A network device configures a first transmission resource and a second transmission resource for UE, and notifies the UE of configured information by using signaling, for example, higher layer signaling dedicated for the UE.

The first transmission resource and the second transmission resource have different carrier frequencies.

102. The network device configures, for the UE, a resource of a physical uplink control channel corresponding to a physical downlink control channel in the second transmission resource, and notifies the UE of the configured information by using the signaling, for example, the higher layer signaling.

The resource of the physical uplink control channel (PUCCH) is located on an uplink carrier corresponding to a downlink carrier of the first transmission resource (an uplink carrier corresponding to a downlink carrier indicated in system broadcast information). The network device configures the resource of the PUCCH for the UE, so that after receiving signaling of at least one physical downlink control channel in a physical downlink control channel, the UE acquires, according to an indication of the signaling or an indication of the higher layer signaling, a resource of a PUCCH corresponding to the at least one physical downlink control channel. In this embodiment of the present invention, the PUCCH corresponding to the physical downlink control channel in the second transmission resource is used to carry answer information sent by the UE for data that is carried in a PDSCH of the second transmission resource. The answer information includes acknowledgement information and negative acknowledgement information. A correspondence between a physical downlink control channel and a PUCCH is that a corresponding PUCCH is used to transmit answer information for data carried in a PDSCH that is scheduled by the physical downlink control channel.

The physical downlink control channel in this embodiment of the present invention may be a physical downlink control channel (PDCCH) defined in the LTE-A standard specification, or may be an enhanced physical downlink control channel (EPDCCH) defined in the LTE-A standard specification. For brevity, the following uses the PDCCH as an example, and is also applicable to the EPDCCH.

103. The network device receives a PUCCH sent by the UE.

104. When information carried in the PUCCH is negative acknowledgement information, the network device retransmits, by using a PDSCH of the first transmission resource, data carried in a PDSCH of the second transmission resource, and indicates, by using signaling of a physical downlink control channel of the first transmission resource, to the UE that data transmitted by the PDSCH of the first transmission resource is retransmitted data carried in the PDSCH of the second transmission resource.

The negative acknowledgement information is the answer information sent by the UE for the data that is carried in the PDSCH of the second transmission resource.

After retransmission of data that is transmitted by the PDSCH of the first transmission resource and that is carried in the PDSCH of the second transmission resource is completed, and after the user equipment receives the retransmitted data, the downlink data probably still cannot be properly decoded. In this case, retransmission continues to be performed on the first transmission resource.

In an implementation manner of the present invention, the network device described in the foregoing FIG. 1 is specifically a first network device, the first transmission resource is a transmission resource used by a first transmission module of the first network device and the UE, and the second transmission resource is a transmission resource used by a second transmission module of the first network device and the UE. In an implementation manner of the present invention, the network device described in the foregoing FIG. 1 is specifically a first network device, the first transmission resource is a transmission resource used by the first network device and the UE, and the second transmission resource is a transmission resource used by a second network device and the UE.

The first network device may configure a same PUCCH resource corresponding to multiple physical downlink control channels and notify the UE of the same PUCCH resource by using signaling, where a first control channel element (CCE) or an enhanced control channel element (ECCE) that is used by the multiple physical downlink control channels may use different resources. If a control channel element of the EPDCCH is distinguished, the ECCE is used for representation. Either the CCE or the ECCE is a basic element forming a physical control channel, and one physical control channel (PDCCH or EPDCCH) may be formed by one or more control channel elements (CCEs or ECEEs).

In another case, the first network device may further configure a same PUCCH resource corresponding to search space of the multiple physical downlink control channels and notifies the UE of the same PUCCH resource by using the signaling, that is, the user equipment may determine, according to received search space information of the physical downlink control channel, a resource of a PUCCH corresponding to a control channel in the search space.

In addition, optionally, the second network device may notify, by using signaling of the at least one physical downlink control channel in the physical downlink control channel, the UE of a resource of a PUCCH corresponding to the at least one physical downlink control channel. The resource of the PUCCH corresponding to the at least one physical downlink control channel is at least one of PUCCH resources configured by the first network device. Specifically, that the second network device notifies, by using at least one signaling in the physical downlink control channel, the user equipment of a resource of a PUCCH corresponding to the at least one physical downlink control channel may include the following several implementation manners:

(1). indicating in control information carried in the at least one physical downlink control channel in the physical downlink control channel, where an indication method may be predefined in the standard specification or preconfigured by the network device for the user equipment; or (2). performing scrambling by using a virtual cell identity or a scrambling code used by the at least one physical downlink control channel in the physical downlink control channel, so as to indicate to the UE the resource of the PUCCH corresponding to the at least one physical downlink control channel, where the virtual cell identity herein is used to generate a parameter of the scrambling code of the at least one physical downlink control channel, and a specific virtual cell identity or scrambling code may be preconfigured by a network for the user equipment by using the signaling; or (3). indicating to the UE the resource of the PUCCH corresponding to the at least one physical downlink control channel by using a specific user equipment identity (for example, a cell radio network temporary identity, shorted by C-RNTI) used for cyclic redundancy check (CRC) bit scrambling of control information carried in the at least one physical downlink control channel in the physical downlink control channel. The specific user equipment identity may be preconfigured by the first network device for the user equipment by using the signaling. The first network device may configure multiple user equipment identities for a user, and one of the multiple user equipment identities is a specific user equipment identity, where the specific user equipment identity may indicate that a resource of a PUCCH corresponding to a physical downlink control channel having the user equipment identity is at least one of the PUCCH resources configured by the first network device for the user equipment.

Figure 2:
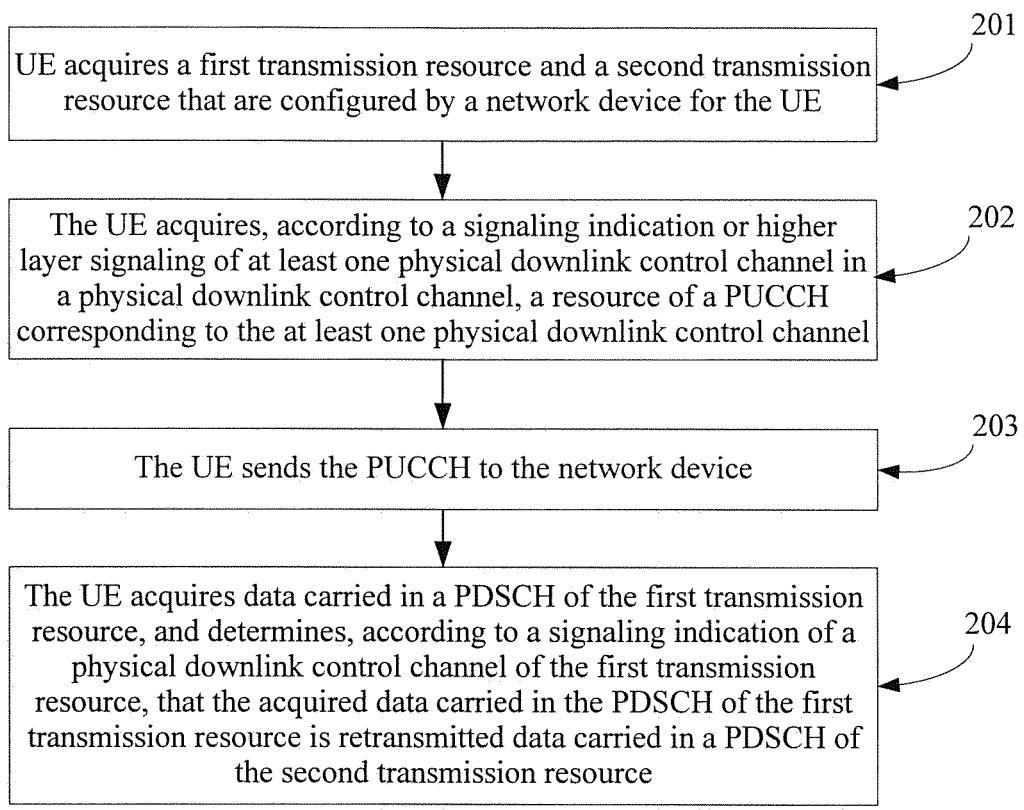
FIG. 2 is a flowchart of a method for configuring a data transmission resource according to Embodiment 1 of the present invention.

According to another aspect, this embodiment of the present invention further provides a method for configuring a data transmission resource and relates to UE. As shown in FIG. 2, the method includes:

201. UE acquires a first transmission resource and a second transmission resource that are configured by a network device for the UE.

Carrier frequencies of the first transmission resource and the second transmission resource are different.

202. The UE acquires, according to a signaling indication or higher layer signaling of at least one physical downlink control channel in a physical downlink control channel, a resource of a PUCCH corresponding to the at least one physical downlink control channel.

The resource of the PUCCH is located on an uplink carrier corresponding to a downlink carrier of the first transmission resource. The resource of the PUCCH is configured by the network device for the UE and corresponds to the physical downlink control channel in the second transmission resource. The PUCCH is used to carry answer information sent by the UE for data that is carried in a PDSCH of the second transmission resource.

In a case in which there are multiple physical downlink control channels of the user equipment in the second transmission resource, and the multiple physical downlink control channels respectively correspond to different PUCCH resource configurations. For example, in addition to the PUCCH resource configured in the present invention, there still is general configuration of a PUCCH that may be related to a CCE used by a PDCCH. In this case, the UE needs to acquire the resource of the PUCCH of the at least one physical downlink control channel according to the signaling indication of the at least one physical downlink control channel in the physical downlink control channel, where the resource of the PUCCH of the at least one physical downlink control channel is at least one of the PUCCH resources configured by the higher layer signaling.

Alternatively, a step in which the UE acquires the resource of the PUCCH of the at least one physical downlink control channel according to the signaling indication of the at least one physical downlink control channel in the physical downlink control channel may be replaced with the following step: the UE detects the at least one physical downlink control channel in the physical downlink control channel, and acquires, by using the higher layer signaling, the resource of the PUCCH corresponding to the at least one physical downlink control channel.

203. The UE sends the PUCCH to the network device.

After negative acknowledgement information that is sent by the UE and that is carried in the PUCCH is acquired by the network device, the network device retransmits data corresponding to the negative acknowledgement information. Specifically, the network device sends, by using a PDSCH of the first transmission resource, a PDSCH that corresponds to the negative acknowledgement information and that is of the second transmission resource. Meanwhile, the network device further needs to inform the UE that data sent by the PDSCH of the first transmission resource is retransmitted data of the PDSCH that corresponds to the negative acknowledgement information and that is of the second transmission resource. In this way, the UE may receive correct retransmitted data, so as to use data transmitted twice for decoding.

204. The UE acquires data carried in a PDSCH of the first transmission resource, and determines, according to a signaling indication of a physical downlink control channel of the first transmission resource, that the acquired data carried in the PDSCH of the first transmission resource is retransmitted data carried in a PDSCH of the second transmission resource.

In an implementation manner of the present invention, the network device described in the foregoing FIG. 2 is specifically a first network device, the first transmission resource is a transmission resource used by the first network device and the UE, and the second transmission resource is a transmission resource used by a second network device and the UE.

Step 204 of the determining that the data carried in the PDSCH of the first transmission resource is retransmitted data carried in a PDSCH of the second transmission resource includes the following several implementation manners:

(1). determining, according to received control information carried in the physical downlink control channel of the first transmission resource, that the acquired data is the retransmitted data carried in the PDSCH of the second transmission resource; or (2). determining, according to a virtual cell identity or a scrambling code used for scrambling of the received physical downlink control channel of the first transmission resource, that the acquired data is the retransmitted data carried in the PDSCH of the second transmission resource; or (3) determining, according to an identity of the UE used for scrambling on CRC of received control information carried in the physical downlink control channel of the first transmission resource, that the acquired data is the retransmitted data carried in the PDSCH of the second transmission resource.

The UE detects, according to CRC in a data packet, whether received downlink data is correct. When a communications system uses a CA technology, both acknowledgement information and negative acknowledgement information that are generated after the UE receives the downlink data are carried on one uplink carrier for feeding back. For example, in this embodiment of the present invention, the network device may include a first network device and a second network device. After the first network device sends the downlink data to the UE by using the first transmission resource and the second network device sends the downlink data to the UE by using the second transmission resource, the UE carries acknowledgement information/negative acknowledgement information for the downlink data sent by the first transmission resource and acknowledgement information/negative acknowledgement information for the downlink data sent by the second transmission resource on an uplink carrier corresponding to a downlink carrier of the first network device for sending.

When the UE receives the PDCCH and the PDSCH that are in the first transmission resource, the PDCCH and the PDSCH are used to retransmit the downlink data of the second transmission resource, and proper decoding still cannot be implemented. Then the UE transmits NACK, where the NACK is carried on a PUCCH channel corresponding to the PDCCH in the first transmission resource, where the PUCCH channel may be a general PUCCH channel configured for the first transmission resource and is used to carry answer information for initial transmission or retransmission of the data in the first transmission resource.

It may be understood that, in this embodiment of the present invention, if receiving the negative acknowledgement information for the downlink data sent by the first transmission resource of the first network device, the first network device retransmits to the UE the downlink data sent by the first transmission resource; and if receiving the negative acknowledgement information for the downlink data sent by the second transmission resource, the first network device retransmits to the UE the downlink data sent by the second transmission resource. The first network device may further transmit its own initially transmitted downlink data.

It needs to be pointed out that, an example in which the first network device is used as a primary device and receives the acknowledgement information/negative acknowledgement information for the downlink data of the second network device is used in this embodiment of the present invention for illustration only. In actual application, the second network device may also receive the acknowledgement information/negative acknowledgement info/illation for the downlink data of the first network device. In this case, the second network device is used as a primary device, not only retransmits its own downlink data, but also takes the place of the first network device to retransmit to the UE the downlink data sent by the first network device. Certainly, the second network device may also transmit its own initially transmitted downlink data.

When receiving the negative acknowledgement information, the first network device retransmits to the UE the data corresponding to the negative acknowledgement information. Specifically, in this embodiment of the present invention, the first network device sends the downlink data to the UE by using the first transmission resource, and the second network device sends the downlink data to the foregoing UE by using the second transmission resource. If the negative acknowledgement information received by the first network device corresponds to the downlink data sent by the first transmission resource, the downlink data sent by the first transmission resource is retransmitted, and if the negative acknowledgement information received by the first network device corresponds to the downlink data sent by the second transmission resource, the downlink data sent by the second transmission resource is retransmitted. Moreover, the first network device indicates, by using the physical downlink control channel of the first transmission resource, to the UE that transmission of this time is initial transmission or retransmission of the downlink data carried in the PDSCH of the first transmission resource or is retransmission of the downlink data carried in the PDSCH of the second transmission resource. When no PDSCH of the first transmission resource sends retransmission of the carried downlink data, the first transmission resource may send initial transmission of the downlink data by using the PDSCH. In this embodiment, both the first network device and the second network device are a network device that serves the user equipment. They may be a same network device, may also be different network devices, or may further be different modules in a same network device. Therefore, the first network device and the second network device may be collectively referred to as the network device.

In an LTE system, an HARQ technology is generally used for reliable data transmission. Specifically, after the network device sends the downlink data to the UE, the UE detects, according to the CRC in the data packet, whether the received downlink data is correct. If a CRC check fails, it indicates that the UE does not correctly decode the received data, and in this case, the UE feeds back the negative acknowledgement information; if the CRC check succeeds, it indicates that the UE correctly decodes the received data, and in this case, the UE feeds back the acknowledgement information. When a communications system uses a CA technology, both acknowledgement information and negative acknowledgement information that are generated after the UE receives the downlink data are carried on one uplink carrier for feeding back. For example, in this embodiment of the present invention, after the first network device and the second network device send the downlink data to the UE respectively by using the first transmission resource and the second transmission resource, the UE carries both the acknowledgement/negative acknowledgement information for the downlink data of the first network device and the acknowledgement/negative acknowledgement information for the downlink data of the second network device on the uplink carrier corresponding to the downlink carrier of the first network device for sending. If receiving the negative acknowledgement information for the downlink data of the second network device, the first network device takes the place of the second network device to retransmit, to the UE by using the first transmission resource, the downlink data sent by the second network device.

In this embodiment of the present invention, the first network device and the second network device may be the following device in an actual application scenario: an eNodeB, an access point (AP), remote radio equipment (RRE), a remote radio head (RRH), a remote radio unit (RRU), or the like. In this embodiment of the present invention, the first transmission resource and the second transmission resource may be a cell, a carrier, or a channel set.

According to the technical solutions in this embodiment of the present invention, the UE does not need to perform time switching to transmit the answer information separately on multiple uplink carriers, but only needs to transmit the answer information to one uplink carrier to ensure that retransmitted data is received in a timely manner. Therefore, no limitation that is brought by transmitting the answer information in an uplink shifting manner is set on scheduling of data transmitted in a downlink direction. This limitation exists because there is a determined relationship between the PDSCH and a subframe in which a channel transmitting the answer information in uplink and downlink directions is located. For example, the PDSCH is transmitted in a subframe n, and corresponding answer information may be only in a subframe n+4, where n is a subframe number from 0 to 9, and when n+4 is greater than 9, it indicates a subframe whose next frame has a subframe number of (n+4)−10. The multiple carriers may transmit the data to a same user at the same time in one subframe, which does not affect a peak rate when multiple network devices use the CA technology for data transmission. This embodiment of the present invention provides the method for configuring a data transmission resource. A network device configures a first transmission resource and a second transmission resource for user equipment. For negative acknowledgement information sent by the user equipment for data that is carried in a physical downlink shared channel of the second transmission resource, the network device retransmits, by using a physical downlink shared channel of the first transmission resource, the foregoing data carried in the physical downlink shared channel of the second transmission resource, and indicates, by using signaling, to the user equipment that the retransmitted data is retransmitted data carried in the physical downlink shared channel of the second transmission resource. According to this embodiment of the present invention, a solution of carrier aggregation can be implemented in a case in which quick information exchange between two network devices or between different units of a same network device is not required, ensuring a high-speed transmission rate of the network device while reducing a requirement on device hardware complexity for implementing the carrier aggregation.

Embodiment 3

Figure 3:
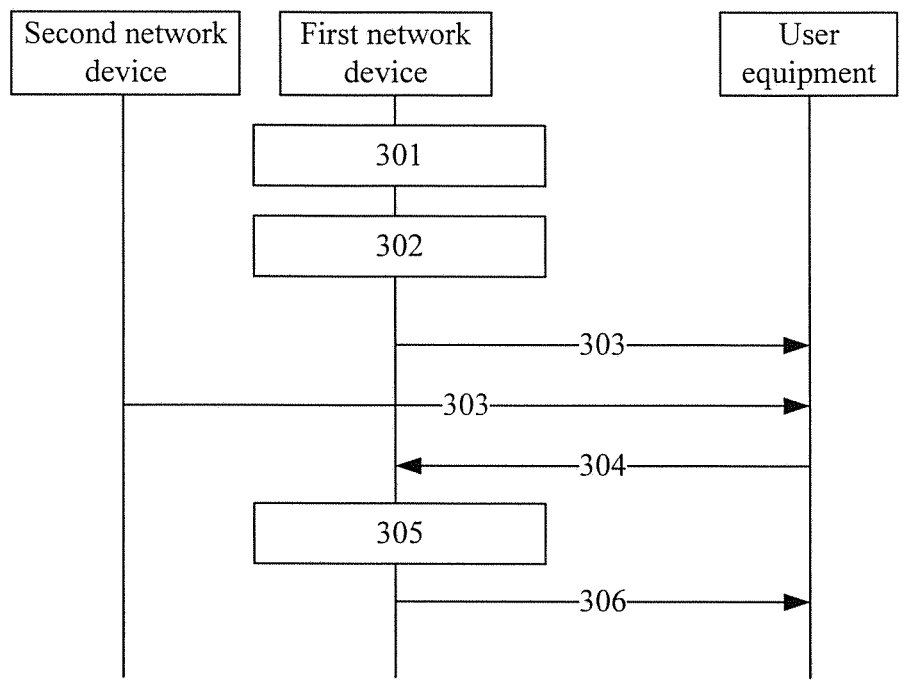
FIG. 3 is a flowchart of a method for configuring a data transmission resource according to Embodiment 2 of the present invention.

This embodiment of the present invention provides a method for configuring a data transmission resource. As shown in FIG. 3, the method includes:

301. A first network device determines downlink data sent by a second network device to UE.

Specifically, the first network device may configure, for the second network device, a transport block size, a scheduling time, and to-be-sent downlink data that are used for data transmission. In addition, a third party may also notify the first network device of the transport block size, the scheduling time, and the to-be-sent downlink data, and then the first network device configures them for the second network device.

A physical resource used for sending downlink data includes a first transmission resource and a second transmission resource, where the first network device controls the first transmission resource to send first downlink data, and the second network device controls the second transmission resource to send the downlink data.

Before a network device uses a CA technology to send data to the UE, a network device having a data retransmission capability first configures, for another network device, the transport block size, the scheduling time, and the to-be-sent downlink data that are used for the data transmission. For example, in this embodiment of the present invention, the first network device can perform data retransmission for the second network device, and then before the data transmission begins, the first network device needs to configure, for the second network device, the transport block size, the scheduling time, and the to-be-sent downlink data that are used for the data transmission. Therefore, the first network device may learn in advance a transport block size, a scheduling time for data transmission, and to-be-sent downlink data that are used by the second network device, and then learns specific content of the downlink data sent by the second network device. For example, the first network device learns, according to configured scheduling time, that downlink data n in a subframe T is sent in the second network device, and then the first network device also learns that the UE sends acknowledgement information/negative acknowledgement information in a subframe T+k for the downlink data n of the second network device. Herein, "k" is predefined in a communications system, for example, k=4. In this way, once the first network device configures a scheduling time of the downlink data n, a time of receiving the acknowledgement information/negative acknowledgement information for the downlink data n is determined at the same time.

It needs to be noted that although the first network device learns in advance and configures, for the second network device, the transport block size, the scheduling time, and the to-be-sent downlink data that are used for the data transmission, the second network device may determine by itself which resource block is used, and which modulation manner and coding manner are used to transmit the downlink data. For example, the second network device determines an available modulation manner, coding manner, and resource block according to a channel quality indicator (CQI)/precoding matrix indicator (PMI)/rank indicator (RI) that is fed back by the UE, and notifies the UE of the available modulation manner, coding manner, and resource block. The UE feeds back, by switching a frequency channel number, the CQI/PMI/RI separately to the first network device and the second network device.

In addition, it needs to be noted that information about the transport block size, the scheduling time, and the to-be-sent downlink data that are configured by the first network device for the second network device and that are used for the data transmission is not content that needs to be learned by the UE in advance.

In addition, the UE further needs to acquire, from the first network device, a first transmission resource and a second transmission resource that are configured by the network device for the UE. Carrier frequencies of the first transmission resource and the second transmission resource are different. The first transmission resource is a transmission resource used by the first network device and the UE, and the second transmission resource is a transmission resource used by a second network device and the UE.

302. The first network device configures, for the UE, a resource of a PUCCH corresponding to a PDCCH of a second transmission resource.

In step 302, a resource of a PUCCH of a group of PDCCHs is configured by the first network device. As another implementation manner, a resource of a PUCCH of a group of EPDCCHs may also be configured. In this embodiment, the PDCCH is used as an example for illustration, which constitutes no limitation.

In addition, that the first network device configures, for the UE, a resource of a PUCCH corresponding to a PDCCH of a second transmission resource may specifically be: configuring a resource of a PUCCH corresponding to part of PDCCH in the second transmission resource.

The resource of the PUCCH is used to carry acknowledgement information/negative acknowledgement information for the downlink data of the second network device.

The resource of the PUCCH is located on an uplink carrier corresponding to a downlink carrier of the first transmission resource.

Specifically, the first network device may configure the resource of the PUCCH for the UE in a static or semi-static manner. For example, the first network device configures the PUCCH for the UE by using higher layer signaling.

The foregoing configured PUCCH does not depend on a CCE or an ECCE resource that corresponds to a data channel and that is used by the PDCCH or the EPDCCH within a resource set of at least one subframe. That is, a time-frequency resource used by the PUCCH is not determined by using the CCE or the ECCE resource that is used by a PDCCH or an EPDCCH of a corresponding subframe, but is configured by a higher layer in a static or semi-static manner. This configuration may specifically be configuration of the PUCCH that is performed for a cell, a carrier, a channel set, a virtual cell identity virtual cell identity of a channel set, or the like. Therefore, even though the first network device controlling the first transmission resource does not know a CCE resource used by a PDCCH channel or an ECCE resource used by an EPDCCH channel when the second network device controlling the second transmission resource sends the downlink data, the first network device may also learn a resource of the PUCCH channel used to carry acknowledgement information/negative acknowledgement information for the downlink data sent by the second transmission resource. In addition to the static or semi-static configuration by the higher layer mentioned above, there still is a configuration method similar to the semi-static configuration in which a network side configures a channel resource set of one PUCCH for the UE, and specifically, which PUCCH is used is notified by using downlink physical signaling. A manner in which the time-frequency resource used by the PUCCH is determined by using the CCE or the ECCE resource that is used by the PDCCH or the EPDCCH is equivalent to an implicit manner of determining the resource of the PUCCH. A manner in which the resource of the PUCCH is configured by the higher layer in the static or semi-static manner is equivalent to an explicit manner of determining the resource of the PUCCH.

In this embodiment of the present invention, because the acknowledgement information/negative acknowledgement information for the downlink data that is sent by the second network device by using the second transmission resource is not transmitted on an uplink carrier corresponding to a downlink carrier of the second network device, a PUCCH used to carry the acknowledgement information/negative acknowledgement information for the downlink data that is sent by the second transmission resource needs to be configured on the uplink carrier corresponding to the downlink carrier of the first network device. As described in the foregoing step 302, the first network device configures the PUCCH for the UE. Still, because the first network device configures, for the second network device, the transport block size, the scheduling time, and the to-be-sent downlink data that are used for the data transmission, a status of downlink data transmission of the second network device is known to the first network device. When receiving, by using the PUCCH, the negative acknowledgement information sent by the UE for the downlink data that is sent by the second transmission resource, the first network device may retransmit the downlink data of the second network device according to known downlink data information of the second network device.

In addition, it needs to be noted that there are multiple manners in which the network device indicates the resource of the PUCCH to the UE, and for details, refer to the foregoing description for step 103b, which is not described herein again.

303. A first network device and a second network device send downlink data to the UE.

A physical resource that is used when the first network device and the second network device send the downlink data includes a first transmission resource and a second transmission resource, where the first network device controls the first transmission resource to send the downlink data, and the second network device controls the second transmission resource to send the downlink data. The first transmission resource and the second transmission resource may be a cell, a carrier, or a channel set.

The first network device and the second network device use different downlink carriers to send the downlink data. By using a CA technology, different downlink carriers are aggregated to implement support for larger downlink bandwidth.

The downlink data may be separated at a higher layer, for example, a Packet Data Convergence Protocol (PPDCP) layer. Then, the downlink data is sent to the UE separately by using a PDCP layer, a Radio Link Control (RLC) layer, a Media Access Control (MAC) layer, and a physical (PHY) layer that are of the first network device and the second network device.

304. When downlink data sent by the second transmission resource fails to be received, the UE sends the PUCCH, where the PUCCH carries negative acknowledgement information for the downlink data that is carried in the PDSCH of the second transmission resource.

After the first network device sends the downlink data to the UE by using the first transmission resource and the second network device sends the downlink data to the UE by using the second transmission resource, the UE detects, according to CRC in the data, whether the downlink data is properly received. If a CRC check fails, it indicates that the UE does not properly decode the received data, and in this case, the UE feeds back the negative acknowledgement information; if the CRC check succeeds, it indicates that the UE properly decodes the received data, and in this case, the UE feeds back the acknowledgement information.

In one case, if the CRC check of the downlink data carried in the PDSCH of the first transmission resource fails, the UE uses the uplink carrier corresponding to the downlink carrier of the first network device to send the negative acknowledgement information for the downlink data that is sent by the first transmission resource.

In another case, if the CRC check of the downlink data carried in the PDSCH of the first transmission resource succeeds, the UE uses the uplink carrier corresponding to the downlink carrier of the first network device to send the acknowledgement information for the downlink data that is sent by the first transmission resource.

In another case, if the CRC check of the downlink data carried in the PDSCH of the second transmission resource fails, the UE uses the uplink carrier corresponding to the downlink carrier of the first network device to send the negative acknowledgement information for the downlink data that is sent by the second transmission resource.

In another case, if the CRC check of the downlink data carried in the PDSCH of the second transmission resource succeeds, the UE uses the uplink carrier corresponding to the downlink carrier of the first network device to send the acknowledgement information for the downlink data that is carried in the PDSCH of the second transmission resource.

When sending the acknowledgement information/negative acknowledgement information, the UE needs to select the PUCCH. According to description of the foregoing step 302, the first network device configures the PUCCH for the UE, and then when needing to send the acknowledgement information/negative acknowledgement information for the downlink data of the first network device, the UE sends the acknowledgement information/negative acknowledgement information by using the PUCCH corresponding to the first network device; and when needing to send the acknowledgement information/negative acknowledgement information for the downlink data of the second network device, the UE sends the acknowledgement information/negative acknowledgement information by using the PUCCH corresponding to the second network device.

It needs to be pointed out that the PUCCH corresponding to the first network device and the PUCCH corresponding to the second network device that are configured by the first network device for the UE may also be a same PUCCH, and the ACK/NACK for the downlink data that is carried in PDSCHs of the first transmission resource and the second transmission resource is transmitted on the PUCCH in a joint coding manner.

Figure 4:
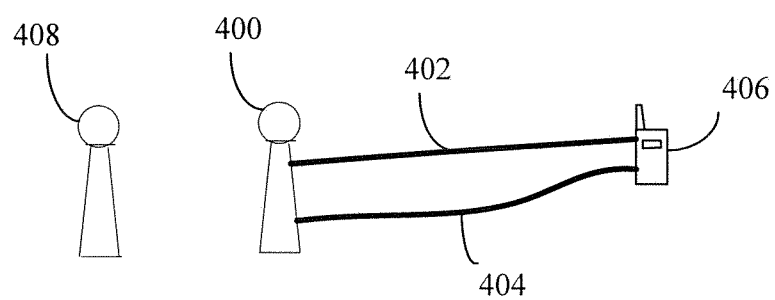
FIG. 4 is a schematic diagram of configuring a PUCCH according to Embodiment 2 of the present invention.

With reference to FIG. 4, the following illustrates specific content that the UE sends the acknowledgement information/negative acknowledgement information by using the PUCCH.

As shown in FIG. 4, a first network device 400 sends downlink data by using a first transmission resource, and a second network device 408 sends downlink data by using a second transmission resource. The first network device 400 configures two PUCCHs for UE 406, where a PUCCH 402 is a PUCCH corresponding to the first network device 400 and is used to transmit acknowledgement information/negative acknowledgement information for a PDSCH of the first transmission resource; and a PUCCH 404 is a PUCCH corresponding to the second network device 408 and is used to transmit acknowledgement information/negative acknowledgement information for a PDSCH of the second transmission resource. After acquiring configuration situations of the two PUCCHs, if needing to send acknowledgement information/negative acknowledgement information for downlink data of the first transmission resource of the first network device 400, the UE 406 sends the acknowledgement information/negative acknowledgement information to the first network device 400 by using the PUCCH 402; and if needing to send acknowledgement information/negative acknowledgement information for downlink data of the second transmission resource of the second network device 408, the UE 406 sends the acknowledgement information/negative acknowledgement information to the first network device 400 by using the PUCCH 404.

305. Acquire, according to time of receiving the negative acknowledgement information for the downlink data that is carried in the PDSCH of the second transmission resource, downlink data that needs to be retransmitted and that is carried in the PDSCH of the second transmission resource.

If receiving the negative acknowledgement information for the downlink data that is carried in the PDSCH of the second transmission resource, the first network device needs to acquire the downlink data that needs to be retransmitted and that is carried in the PDSCH of the second transmission resource. Because the first network device configures scheduling time and to-be-sent downlink data for the second network device in step 301, the downlink data of the second network device has been stored in the first network device. The scheduling time of the downlink data of the second network device is determined according to a moment of receiving the NACK, so that downlink data that needs to be retransmitted is determined. In addition, the first network device may also retransmit, according to the time of receiving the NACK for the downlink data that is sent by the first transmission resource, the downlink data carried in the PDSCH of the first transmission resource.

306. Retransmit, to the UE by using a PDSCH of the first transmission resource, the downlink data carried in the PDSCH of the second transmission resource, and indicate, by using signaling of a PDCCH of the first transmission resource, to the UE that the downlink data carried in the PDSCH of the second transmission resource is retransmitted this time.

After receiving the retransmitted data, the UE combines the acquired data carried in the PDSCH of the first transmission resource with initially transmitted data corresponding to the acquired data.

A specific method for indicating to the UE by using the PDCCH in step 306 may include: indicating in control information carried in the PDCCH. By providing indication information in the PDCCH, the UE is notified that transmission of this time is retransmission of the data carried in the PDSCH of the second transmission resource, so that the UE properly receives the data.

This embodiment of the present invention further provides another manner of indicating to the UE. By using different virtual cell identities or scrambling codes used for scrambling of the PDCCH of the first transmission resource, the user equipment is indicated that the transmission is the retransmission of the data carried in the PDSCH of the second transmission resource.

When scrambling is performed on the PDCCH, different virtual cell identities or scrambling codes are used. Therefore, it may implicitly indicate, by using a difference between virtual cell identities or scrambling codes, whether transmission of this time is retransmission of the downlink data of the second transmission resource. By analyzing the virtual cell identity or the scrambling code, the UE determines whether the transmission of this time is the retransmission of the downlink data of the second transmission resource.

This embodiment of the present invention further provides another manner of indicating to the UE. By using different identities of the UE used for scrambling on CRC of control information carried in the PDCCH of the first transmission resource, the user equipment is indicated that the retransmission is the retransmission of the data carried in the PDSCH of the second transmission resource.

When scrambling is performed on the CRC of the control information carried in the PDCCH, different user equipment identities of the user equipment are used. Therefore, it may implicitly indicate, by using a difference between the user equipment identities, whether transmission of this time is retransmission of the downlink data of the second transmission resource for the user equipment. By detecting a user identity used for the CRC scrambling, the UE determines whether the transmission of this time is the retransmission of the downlink data of the second transmission resource. For example, for UE 1, if it is detected that the user equipment identity used for the CRC scrambling is ID 1, it is determined that transmission of this time is retransmission of the downlink data that is sent by the first network device to the UE 1 and that is of the second transmission resource. If it is detected that the user equipment identity used for the CRC scrambling is ID 2, the transmission of this time is not retransmission of the downlink data for the second transmission resource, but initial transmission or retransmission of the downlink data transmitted by the first transmission resource of the UE 1. A user equipment identity of the user equipment used for the CRC scrambling of the PDCCH that is in the first transmission resource and that retransmits the data of the second resource and a user equipment identity of the user equipment used by the physical downlink control channel in the second transmission resource may be the same or may be different, that is, the two user equipment identities may be separately configured, so as to reduce complexity of allocating user equipment identities of two carriers. The first network device may configure, by using independent higher layer signaling, these multiple user equipment identities for the user equipment.

It needs to be noted that when step 306 is executed, the first network device needs to indicate, to the UE by using a control channel, a transmission resource corresponding to HARQ process information carried by the control channel, so that the UE properly receives the retransmitted downlink data. The control channel may specifically be a PDCCH or an EPDCCH.

In addition, a network side may configure PDCCH search space for the UE, so that the UE detects retransmission of the downlink data of the second network device within a scope of the PDCCH search space. If the PDCCH search space is not separately configured, existing PDCCH search space may be reused to detect the retransmission of the downlink data of the second network device.

It needs to be pointed out that, an example in which the first network device is used as a primary device and receives the acknowledgement information/negative acknowledgement information for the downlink data that is sent by the second network device by using the second transmission resource is used in this embodiment of the present invention for illustration only. In actual application, the second network device may also receive the acknowledgement information/negative acknowledgement information for the downlink data that is sent by the first network device by using the first transmission resource. In this case, the second network device is used as a primary device, not only retransmits its own downlink data, but also takes the place of the first network device to retransmit to the UE the downlink data sent by the first transmission resource.

The first network device and the second network device in this embodiment of the present invention may be the following device in an actual application scenario: an eNodeB, an AP, an RRE, an RRH, an RRU, or the like.

In this embodiment of the present invention, two network devices, that is, the first network device and the second network device are used as an example to describe processes of sending and receiving the retransmitted data. In actual application, a case of more than two network devices may be applied by expanding. For example, when three network devices (it is assumed that the three network devices are respectively a network device 1, a network device 2, and a network device 3) use the CA technology to provide data for the UE, if backhaul between the network device 1 and the network device 2 is ideal backhaul, and both backhaul between the network device 1 and the network device 3 and backhaul between the network device 3 and the network device 2 are non-ideal backhaul, there are the following several cases for data retransmission:

a. The network device 1 or the network device 2 is a master network device having a data retransmission capability. It is assumed that the network device 1 is a master network device, the network device 1 needs to preconfigure, for the network device 3, a transport block size, scheduling time, and to-be-sent downlink data that are used for data transmission, and retransmits downlink data of the network device 3 to the UE when receiving negative acknowledgement information for the network device 3. Because the backhaul between the network device 2 and the network device 1 is ideal backhaul, the network device 1 does not need to take the place of the network device 2 to retransmit the downlink data, but only needs to forward, to the network device 2, acknowledgement information/negative acknowledgement information that is sent by the UE for the network device 2, and the network device 2 performs a subsequent sending action.

b. The network device 3 is a master network device having a data retransmission capability. In this case, the network device 3 needs to separately preconfigure, for the network device 1 and the network device 2, the transport block size, the scheduling time, and the to-be-sent downlink data that are used for the data transmission, and retransmits downlink data of the network device 1 or the network device 2 to the UE when receiving negative acknowledgement information for the network device 1 or the network device 2.

It can be learned that in a case of more than two network devices, the master network device retransmits downlink data of a network device of a first type when receiving negative acknowledgement information that is sent by the UE for the network device of the first type. The network device of the first type here refers to a network device with which the master network device has non-ideal backhaul. For a network device of a second type that has ideal backhaul with the master network device, the master network device only forwards negative acknowledgement information for the network device of the second type to the network device of the second type, and the network device of the second type performs retransmission by itself.

The data transmission method described in this embodiment of the present invention is different from semi-persistent scheduling (SPS) in the prior art. A PUCCH channel corresponding to initial transmission in an SPS technology is explicitly indicated by higher layer signaling and signaling in the PDCCH, and retransmission of downlink data in the SPS technology is indicated by using a PDCCH of an SPS-C-RNTI mask. However, retransmission and initial transmission are performed on a same carrier. Further, in the SPS technology, an uplink resource and a downlink resource only need to be allocated once by using the PDCCH, and they may be reused for a period of time later. This process is optional in the present invention. In addition, the data transmission method described in this embodiment of the present invention is also different from a hopping sending manner in the prior art. In an HARQ process of the hopping sending manner, different subframes may use different frequency resources to send data, for example, multiple carriers, so as to obtain a frequency diversity gain or avoid interference. However, the user equipment is notified, in an implicit manner, of both PUCCH channels corresponding to initial transmission and retransmission in one HARQ process, which is related to a reference numeral of a CCE occupied by the PDCCH. Moreover, multiple times of retransmission of one data packet may be switched among multiple carriers back and forth.

This embodiment of the present invention provides the method for configuring a data transmission resource. UE receives a resource of a PUCCH that is configured by a network device and that corresponds to a PDCCH in a second transmission resource, and when data carried in a PDSCH of the second transmission resource fails to be received, sends the PUCCH to the network device, carries negative acknowledgement information on the PUCCH, later receives data carried in a PDSCH of a first transmission resource, and determines, according to a signaling indication of a PDCCH of the first transmission resource, that the data sent by the PDSCH of the first transmission resource is retransmitted data that corresponds to the negative acknowledgement information and that is carried in the PDSCH of the second transmission resource. According to this embodiment of the present invention, a solution of carrier aggregation can be implemented in a case in which quick information exchange between network devices is not required, ensuring a high-speed transmission rate of the network device while reducing a requirement on device hardware complexity for implementing the carrier aggregation.

In addition, in this embodiment of the present invention, because a first network device configures, for a second network device, a transport block size, scheduling time, and to-be-sent downlink data that are used for data transmission, and configures a PUCCH, the first network device may directly receive negative acknowledgement information that is sent by the UE for downlink data of the second network device, and select, according to the negative acknowledgement information, corresponding downlink data for retransmission. The second network device does not need to participate in an entire retransmission process.

Embodiment 3

Figure 5:
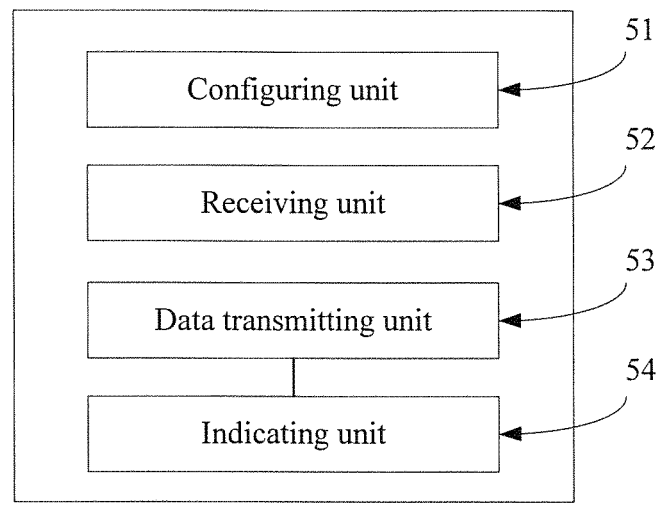
FIG. 5 is a schematic diagram of composition of a network device according to Embodiment 3 of the present invention.

This embodiment of the present invention provides a network device. As shown in FIG. 5, the network device includes: a configuring unit 51, a receiving unit 52, a data transmitting unit 53, and an indicating unit 54.

The configuring unit 51 is configured to configure a first transmission resource and a second transmission resource for UE.

Carrier frequencies of the first transmission resource and the second transmission resource are different.

The configuring unit 51 is further configured to configure, for the UE, a resource of a PUCCH corresponding to a physical downlink control channel in the second transmission resource, where the resource of the PUCCH is located on an uplink carrier corresponding to a downlink carrier of the first transmission resource, and the resource of the PUCCH is acquired by the UE according to a signaling indication or higher layer signaling of at least one physical downlink control channel in the physical downlink control channel, where the PUCCH is used to carry answer information sent by the UE for data that is carried in a PDSCH of the second transmission resource.

The receiving unit 52 is configured to receive the PUCCH sent by the UE, where when information carried in the PUCCH is negative acknowledgement information, the negative acknowledgement information is the answer information sent by the UE for the data that is carried in the PDSCH of the second transmission resource.

The data transmitting unit 53 is configured to retransmit, by using a PDSCH of the first transmission resource, the data carried in the PDSCH of the second transmission resource.

The indicating unit 54 is configured to indicate, by using signaling of a physical downlink control channel of the first transmission resource, to the UE that the data that is retransmitted by the data transmitting unit 53 and that is carried in the PDSCH of the first transmission resource is retransmitted data carried in the PDSCH of the second transmission resource.

The indicating unit 54 may specifically be configured to:

indicate, by using control information carried in the physical downlink control channel of the first transmission resource, to the UE that the data transmitted by the PDSCH of the first transmission resource is the retransmitted data carried in the PDSCH of the second transmission resource; or indicate, by performing scrambling on the physical downlink control channel of the first transmission resource by using a virtual cell identity or a scrambling code, to the UE that the data transmitted by the PDSCH of the first transmission resource is the retransmitted data carried in the PDSCH of the second transmission resource; or indicate, by performing, by using an identity of the UE, scrambling on CRC of control information carried in the physical downlink control channel of the first transmission resource, to the UE that the data transmitted by the PDSCH of the first transmission resource is the retransmitted data carried in the PDSCH of the second transmission resource.

The resource of the PUCCH is located on an uplink carrier corresponding to a downlink carrier of the first transmission resource.

The network device provided in this embodiment of the present invention is used as a first network device and uses a CA technology together with a second network device to provide downlink data for the UE. The first network device serves as a primary network device, receives acknowledgement information/negative acknowledgement information that is sent by the UE for downlink data of the first network device, receives acknowledgement information/negative acknowledgement information that is sent by the UE for downlink data of the second network device, and retransmits the downlink data after receiving the negative acknowledgement information.

Figure 6:
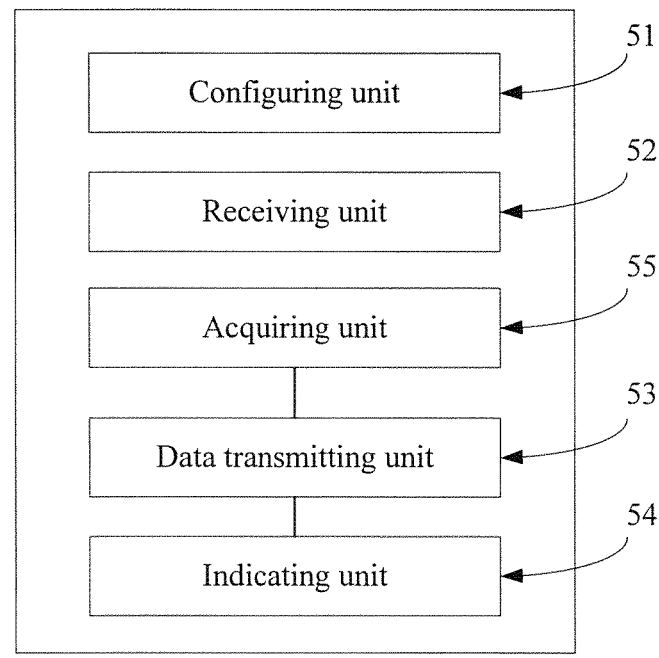
FIG. 6 is a schematic diagram of composition of another network device according to Embodiment 3 of the present invention.

Further, as shown in FIG. 6, the network device further includes an acquiring unit 55. The acquiring unit 55 is configured to: before the data transmitting unit 53 retransmits, by using a PDSCH of the first transmission resource, the data carried in the PDSCH of the second transmission resource, acquire, according to the negative acknowledgement information, the data carried in the PDSCH of the second transmission resource.

That the UE acquires the resource of the PUCCH according to a signaling indication of at least one physical downlink control channel in the physical downlink control channel specifically includes:

acquiring, by the UE, the resource of the PUCCH by using control information carried in the at least one physical downlink control channel in the physical downlink control channel; or acquiring, by the UE, the resource of the PUCCH by performing scrambling on the at least one physical downlink control channel in the physical downlink control channel by using a virtual cell identity or a scrambling code; or acquiring, by the UE, the resource of the PUCCH by performing, by using an identity of the user equipment, scrambling on cyclic redundancy check CRC of control information carried in the at least one physical downlink control channel in the physical downlink control channel.

In another implementation manner of the present invention, the configuring unit 51 is specifically configured to configure, for the UE, a resource of a PUCCH corresponding to part of physical downlink control channels in the second transmission resource.

In another implementation manner of the present invention, the network device shown in FIG. 5 and FIG. 6 in this embodiment of the present invention is used as the first network device, which uses different downlink carriers together with the second network device to send the downlink data. The first transmission resource is a transmission resource used by the first network device and the UE, and the second transmission resource is a transmission resource used by the second network device and the UE. Moreover, the first network device and the second network device may specifically be the following device: an eNodeB, an AP, an RRE, an RRH, an RRU, or the like.

Figure 7:
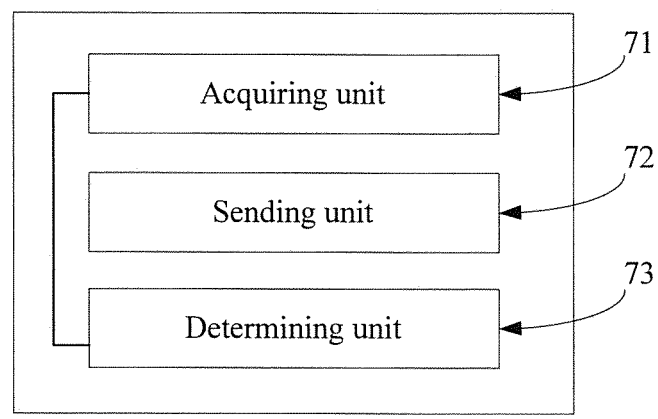
FIG. 7 is a schematic diagram of composition of user equipment according to Embodiment 3 of the present invention.

According to another aspect, this embodiment of the present invention further provides UE. As shown in FIG. 7, the UE includes:

an acquiring unit 71, a sending unit 72, and a determining unit 73.

The acquiring unit 71 is configured to acquire a first transmission resource and a second transmission resource that are configured by a network device for the user equipment UE, where carrier frequencies of the first transmission resource and the second transmission resource are different.

The acquiring unit 71 is further configured to acquire, according to a signaling indication or higher layer signaling of at least one physical downlink control channel in a physical downlink control channel, a resource of a PUCCH corresponding to the at least one physical downlink control channel, where the resource of the PUCCH is located on an uplink carrier corresponding to a downlink carrier of the first transmission resource, and the resource of the PUCCH is configured by the network device for the UE and corresponds to the physical downlink control channel in the second transmission resource, where the PUCCH is used to carry answer information sent by the UE for data that is carried in a PDSCH of the second transmission resource.

The sending unit 72 is configured to send, to the network device, the PUCCH acquired by the acquiring unit 71, where information carried in the PUCCH is negative acknowledgement information, and the negative acknowledgement information is the answer information sent by the UE for the data that is carried in the PDSCH of the second transmission resource.

The acquiring unit 71 is further configured to: acquire data carried in a PDSCH of the first transmission resource, and acquire a signaling indication or higher layer signaling of a physical downlink control channel of the first transmission resource.

The determining unit 73 is configured to determine, according to the signaling indication or the higher layer signaling that is acquired by the acquiring unit 71 and that is of the physical downlink control channel of the first transmission resource, that the acquired data carried in the PDSCH of the first transmission resource is retransmitted data carried in the PDSCH of the second transmission resource.

In another implementation manner of the present invention, the determining unit 73 is specifically configured to:

determine, according to received control information carried in the physical downlink control channel of the first transmission resource, that the acquired data is the retransmitted data carried in the PDSCH of the second transmission resource; or determine, according to a virtual cell identity or a scrambling code used for scrambling of the received physical downlink control channel of the first transmission resource, that the acquired data is the retransmitted data carried in the PDSCH of the second transmission resource; or determine, according to an identity of the UE used for scrambling on cyclic redundancy check CRC of received control information carried in the physical downlink control channel of the first transmission resource, that the acquired data is the retransmitted data carried in the PDSCH of the second transmission resource.

In another implementation manner of the present invention, the acquiring unit 71 is specifically configured to:

acquire the resource of the PUCCH corresponding to the at least one physical downlink control channel according to received control information carried in the at least one physical downlink control channel; or acquire the resource of the PUCCH corresponding to the at least one physical downlink control channel according to a virtual cell identity or a scrambling code used for scrambling of the received at least one physical downlink control channel; or acquire the resource of the PUCCH corresponding to the at least one physical downlink control channel according to an identity of the UE used for scrambling on cyclic redundancy check CRC of received control information carried in the at least one physical downlink control channel.

Figure 8:
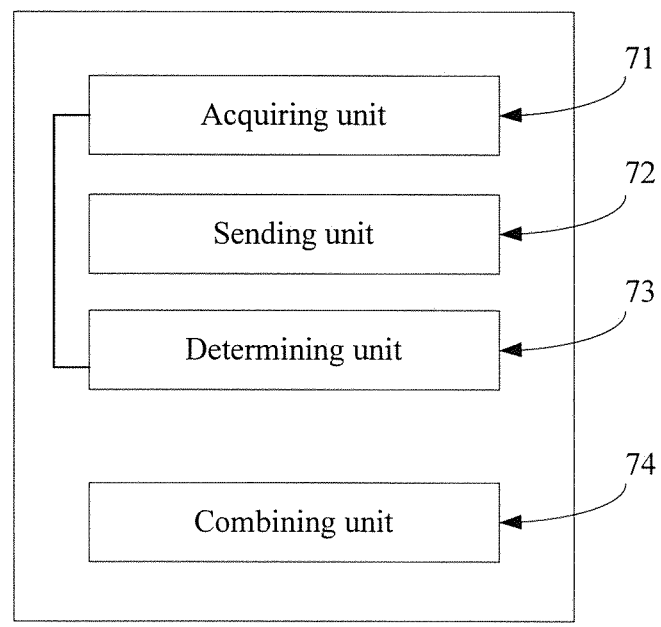
FIG. 8 is a schematic diagram of composition of another user equipment according to Embodiment 3 of the present invention.

Further, as shown in FIG. 8, the UE further includes a combining unit 74, configured to combine the acquired data carried in the PDSCH of the first transmission resource with initially transmitted data corresponding to the acquired data.

In another implementation manner of the present invention, the acquiring unit 71 is specifically configured to acquire, according to a signaling indication of at least one physical downlink control channel of part of physical downlink control channels, the resource of the physical uplink control channel PUCCH corresponding to the at least one physical downlink control channel.

In another implementation manner of the present invention, the network device is a first network device, the first transmission resource is a transmission resource used by the first network device and the UE, and the second transmission resource is a transmission resource used by a second network device and the UE.

This embodiment of the present invention provides the network device and the UE. The UE receives a resource of a PUCCH corresponding to a PDCCH in a second transmission resource configured by the network device, and when data carried in a PDSCH of the second transmission resource fails to be received, sends the PUCCH to the network device, carries negative acknowledgement information in the PUCCH, later receives data carried in a PDSCH of a first transmission resource, and determines, according to a signaling indication of a PDCCH of the first transmission resource, the data sent by the PDSCH of the first transmission resource is retransmitted data carried in the PDSCH that corresponds to the negative acknowledgement information and that is of the second transmission resource. According to this embodiment of the present invention, a solution of carrier aggregation can be implemented in a case in which quick information exchange between network devices is not required, ensuring a high-speed transmission rate of the network device while reducing a requirement on device hardware complexity for implementing the carrier aggregation.

Embodiment 4

Figure 9:
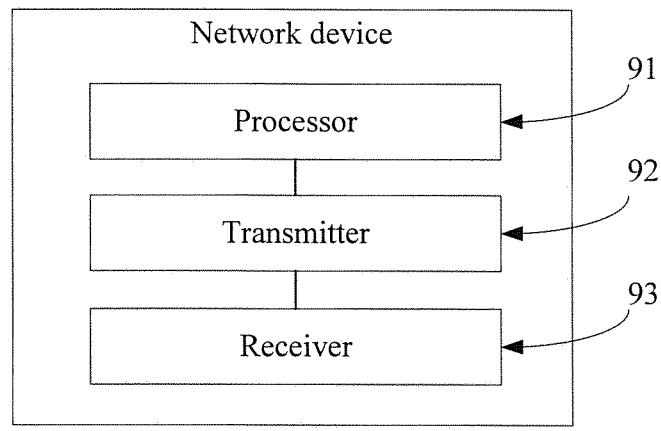
FIG. 9 is a schematic diagram of composition of a network device according to Embodiment 4 of the present invention.

This embodiment of the present invention provides a network device. As shown in FIG. 9, the network device includes: a processor 91, a transmitter 92, and a receiver 93.

The processor 91 is configured to configure a first transmission resource and a second transmission resource for user equipment, where carrier frequencies of the first transmission resource and the second transmission resource are different.

The processor 91 is further configured to configure, for the UE, a resource of a PUCCH corresponding to a physical downlink control channel in the second transmission resource, where the resource of the PUCCH is located on an uplink carrier corresponding to a downlink carrier of the first transmission resource, and the resource of the PUCCH is acquired by the UE according to a signaling indication or higher layer signaling of at least one physical downlink control channel in the physical downlink control channel, where the PUCCH is used to carry answer information sent by the UE for data that is carried in a PDSCH of the second transmission resource.

That the UE acquires the resource of the PUCCH according to a signaling indication of at least one physical downlink control channel in the physical downlink control channel may specifically include the following several cases:

acquiring, by the UE, the resource of the PUCCH by using control information carried in the at least one physical downlink control channel in the physical downlink control channel; or acquiring, by the UE, the resource of the PUCCH by performing scrambling on the at least one physical downlink control channel in the physical downlink control channel by using a virtual cell identity or a scrambling code; or acquiring, by the UE, the resource of the PUCCH by performing, by using an identity of the user equipment, scrambling on cyclic redundancy check CRC of control information carried in the at least one physical downlink control channel in the physical downlink control channel.

The receiver 93 is configured to receive the PUCCH sent by the UE, where when information carried in the PUCCH is negative acknowledgement information, the negative acknowledgement information is the answer information sent by the UE for the data that is carried in the PDSCH of the second transmission resource.

The transmitter 92 is configured to retransmit, by using a PDSCH of the first transmission resource, the data carried in the PDSCH of the second transmission resource.

The transmitter 92 is further configured to indicate, by using signaling of a physical downlink control channel of the first transmission resource, to the UE that the data transmitted by the PDSCH of the first transmission resource is retransmitted data carried in the PDSCH of the second transmission resource.

The transmitter 92 is specifically configured to: indicate, by using control information carried in the physical downlink control channel of the first transmission resource, to the UE that the data transmitted by the PDSCH of the first transmission resource is the retransmitted data carried in the PDSCH of the second transmission resource; or indicate, by performing scrambling on the physical downlink control channel of the first transmission resource by using a virtual cell identity or a scrambling code, to the UE that the data transmitted by the PDSCH of the first transmission resource is the retransmitted data carried in the PDSCH of the second transmission resource; or indicate, by performing, by using an identity of the UE, scrambling on cyclic redundancy check CRC of control information carried in the physical downlink control channel of the first transmission resource, to the UE that the data transmitted by the PDSCH of the first transmission resource is the retransmitted data carried in the PDSCH of the second transmission resource.

The processor 91 is further configured to: before the transmitter 92 transmits, by using a PDSCH of the first transmission resource, the data carried in the PDSCH of the second transmission resource, acquire, according to the negative acknowledgement information, the data carried in the PDSCH of the second transmission resource.

In another implementation manner of the present invention, the processor 91 is specifically configured to configure, for the UE, a resource of a PUCCH corresponding to part of physical downlink control channels in the second transmission resource.

In another implementation manner of the present invention, the network device is a first network device, the first transmission resource is a transmission resource used by the first network device and the UE, and the second transmission resource is a transmission resource used by a second network device and the UE.

The network device provided in this embodiment of the present invention is used as a first network device and uses a CA technology together with a second network device to jointly provide downlink data for the UE. The first network device serves as a primary network device, receives acknowledgement information/negative acknowledgement information that is sent by the UE for downlink data of the first network device, receives acknowledgement information/negative acknowledgement information that is sent by the UE for downlink data of the second network device, and retransmits the downlink data after receiving the negative acknowledgement information.

It needs to be noted that the network device shown in FIG. 9 in this embodiment of the present invention is used as a first network device and uses different downlink carriers together with a second network device to send downlink data. Moreover, the first network device and the second network device may specifically be the following device: an eNodeB, an AP, an RRE, an RRH, an RRU, or the like.

Figure 10:
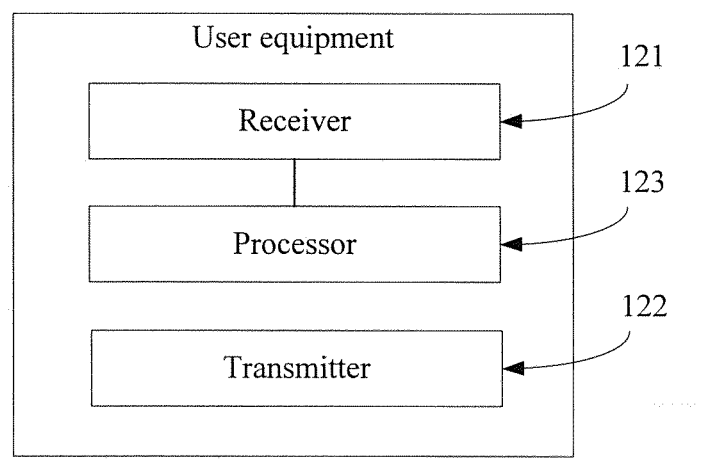
FIG. 10 is a schematic diagram of composition of user equipment according to Embodiment 4 of the present invention.

According to another aspect, this embodiment of the present invention further provides UE. As shown in FIG. 10, the UE includes a receiver 121, a transmitter 122, and a processor 123.

The receiver 121 is configured to acquire a first transmission resource and a second transmission resource that are configured by a network device for the UE, where carrier frequencies of the first transmission resource and the second transmission resource are different.

The receiver 121 is further configured to receive a signaling indication or higher layer signaling of at least one physical downlink control channel in a physical downlink control channel.

The processor 123 is configured to acquire, according to the signaling indication or the higher layer signaling that is received by the receiver 121 and that is of the at least one physical downlink control channel in the physical downlink control channel, a resource of a PUCCH corresponding to the at least one physical downlink control channel, where the resource of the PUCCH is located on an uplink carrier corresponding to a downlink carrier of the first transmission resource, and the resource of the PUCCH is configured by the network device for the UE and corresponds to the physical downlink control channel in the second transmission resource, where the PUCCH is used to carry answer information sent by the UE for data that is carried in a PDSCH of the second transmission resource.

The transmitter 122 is configured to send the PUCCH to the network device, where information carried in the PUCCH is negative acknowledgement information, and the negative acknowledgement information is the answer information sent by the UE for the data that is carried in the PDSCH of the second transmission resource.

The receiver 121 is further configured to: acquire data carried in a PDSCH of the first transmission resource, and acquire a signaling indication of a physical downlink control channel of the first transmission resource.

The processor 123 is further configured to determine, according to the signaling indication that is acquired by the receiver 91 and that is of the physical downlink control channel of the first transmission resource, that the acquired data carried in the PDSCH of the first transmission resource is retransmitted data carried in the PDSCH of the second transmission resource.

Further, the processor 123 is specifically configured to: determine, according to received control information carried in the physical downlink control channel of the first transmission resource, that the acquired data is the retransmitted data carried in the PDSCH of the second transmission resource; or determine, according to a virtual cell identity or a scrambling code used for scrambling of the received physical downlink control channel of the first transmission resource, that the acquired data is the retransmitted data carried in the PDSCH of the second transmission resource; or determine, according to an identity of the UE used for scrambling on cyclic redundancy check (CRC) of received control information carried in the physical downlink control channel of the first transmission resource, that the acquired data is the retransmitted data carried in the PDSCH of the second transmission resource.

In another implementation manner of the present invention, the processor 123 may further be specifically configured to acquire the resource of the PUCCH corresponding to the at least one physical downlink control channel according to received control information carried in the at least one physical downlink control channel; or acquire the resource of the PUCCH corresponding to the at least one physical downlink control channel according to a virtual cell identity or a scrambling code used for scrambling of the received at least one physical downlink control channel; or acquire the resource of the PUCCH corresponding to the at least one physical downlink control channel according to an identity of the UE used for scrambling on cyclic redundancy check (CRC) of received control information carried in the at least one physical downlink control channel.

The processor 123 is further configured to combine the acquired data carried in the PDSCH of the first transmission resource with initially transmitted data corresponding to the acquired data.

In addition, the processor 123 is further specifically configured to acquire, according to a signaling indication of at least one physical downlink control channel of part of physical downlink control channels, the resource of the physical uplink control channel (PUCCH) corresponding to the at least one physical downlink control channel.

This embodiment of the present invention provides the network device and the UE. The UE receives a resource of a PUCCH corresponding to a PDCCH in a second transmission resource configured by the network device, and when data carried in a PDSCH of the second transmission resource fails to be received, sends the PUCCH to the network device, carries negative acknowledgement information in the PUCCH, later receives data carried in a PDSCH of a first transmission resource, and determines, according to a signaling indication of a PDCCH of the first transmission resource, the data sent by the PDSCH of the first transmission resource is retransmitted data carried in the PDSCH that corresponds to the negative acknowledgement information and that is of the second transmission resource. According to this embodiment of the present invention, a solution of carrier aggregation can be implemented in a case in which quick information exchange between network devices is not required, ensuring a high-speed transmission rate of the network device while reducing a requirement on device hardware complexity for implementing the carrier aggregation.

It may be clearly understood by persons skilled in the art that, for the purpose of convenient and brief description, division of the foregoing functional modules is used as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A method for configuring a data transmission resource, the method comprising:

configuring, by a first network device, a first transmission resource and a second transmission resource for a user equipment (UE), the first transmission resource used by the first network device and the UE, the second transmission resource used by a second network device and the UE, wherein carrier frequencies of the first transmission resource and the second transmission resource are different;

configuring, by the first network device for the UE, a resource of a physical uplink control channel (PUCCH) corresponding to a physical downlink control channel in the second transmission resource, wherein the resource of the PUCCH is located on an uplink carrier corresponding to a downlink carrier of the first transmission resource, wherein the resource of the PUCCH is configured to be acquired by the UE according to a signaling indication or higher layer signaling of at least one physical downlink control channel in the physical downlink control channel, wherein the PUCCH is used to carry answer information sent by the UE for data that is carried in a physical downlink shared channel (PDSCH) of the second transmission resource;

receiving, by the first network device, the PUCCH sent by the UE; and when information carried in the PUCCH comprises negative acknowledgement information sent by the UE for the data that is carried in the PDSCH of the second transmission resource, retransmitting, by the first network device by using a PDSCH of the first transmission resource, the data carried in the PDSCH of the second transmission resource, and indicating, by using signaling of a physical downlink control channel of the first transmission resource, to the UE that the data transmitted by the PDSCH of the first transmission resource is retransmitted data carried in the PDSCH of the second transmission resource, wherein the indicating comprises performing scrambling on the physical downlink control channel of the first transmission resource.

2. The method according to claim 1, wherein the scrambling is performed on the physical downlink control channel of the first transmission resource by using a virtual cell identity or a scrambling code.

3. The method according to claim 1, wherein the scrambling is performed, using an identity of the UE, on a cyclic redundancy check (CRC) of control information carried in the physical downlink control channel of the first transmission resource.

4. The method according to claim 1, wherein before retransmitting, by the first network device by using a PDSCH of the first transmission resource, the data carried in the PDSCH of the second transmission resource, the method further comprises:

acquiring, by the first network device, according to the negative acknowledgement information, the data carried in the PDSCH of the second transmission resource.

5. The method according to claim 1, wherein configuring, by the first network device for the UE, a resource of a PUCCH corresponding to a physical downlink control channel in the second transmission resource comprises:

configuring, by the first network device for the UE, a resource of a PUCCH corresponding to part of physical downlink control channels in the second transmission resource.

6. A network device, comprising:
a processor, configured to:
configure a first transmission resource and a second transmission resource for a user equipment (UE), the first transmission resource used by the network device and the UE, the second transmission resource used by a second network device and the UE, wherein carrier frequencies of the first transmission resource and the second transmission resource are different, and configure, for the UE, a resource of a physical uplink control channel (PUCCH) corresponding to a physical downlink control channel in the second transmission resource, wherein the resource of the PUCCH is located on an uplink carrier corresponding to a downlink carrier of the first transmission resource, wherein the resource of the PUCCH is configured to be acquired by the UE according to a signaling indication or higher layer signaling of at least one physical downlink control channel in the physical downlink control channel, wherein the PUCCH is used to carry answer information sent by the UE for data that is carried in a physical downlink shared channel (PDSCH) of the second transmission resource;

a receiver, configured to receive the PUCCH sent by the UE; and a transmitter, configured to, when the information carried in the PUCCH comprises negative acknowledgement information sent by the UE for the data that is carried in the PDSCH of the second transmission resource:

retransmit, by using a PDSCH of the first transmission resource, the data carried in the PDSCH of the second transmission resource, and indicate, by using signaling of a physical downlink control channel of the first transmission resource, to the UE that the data transmitted by the PDSCH of the first transmission resource is retransmitted data carried in the PDSCH of the second transmission resource, wherein the transmitter is configured to indicate to the UE by performing scrambling on the physical downlink control channel of the first transmission resource.

7. The network device according to claim 6, wherein the transmitter is configured to perform the scrambling on the physical downlink control channel of the first transmission resource by using a virtual cell identity or a scrambling code.

8. The network device according to claim 6, wherein the transmitter is configured to perform, using an identity of the UE, scrambling on a cyclic redundancy check (CRC) of control information carried in the physical downlink control channel of the first transmission resource.

9. The network device according to claim 6, wherein the processor is configured to:

before the transmitter transmits, by using a PDSCH of the first transmission resource, the data carried in the PDSCH of the second transmission resource, acquire, according to the negative acknowledgement information, the data carried in the PDSCH of the second transmission resource.

10. The network device according to claim 6, wherein the processor is configured to:

configure, for the UE, a resource of a PUCCH corresponding to part of physical downlink control channels in the second transmission resource.

* * * * *